United States Patent [19]
Arney

[11] 3,872,429
[45] Mar. 18, 1975

[54] OIL LEVEL INDICATING DEVICE FOR A CRANKCASE OR TRANSMISSION

[76] Inventor: Thomas J. Arney, P.O. Box 2263, Castro Valley, Calif. 94546

[22] Filed: Sept. 10, 1973

[21] Appl. No.: 396,061

[52] U.S. Cl............... 340/59, 200/84 R, 340/244 A
[51] Int. Cl. ...................... B60q 1/00, G08b 21/00
[58] Field of Search......... 340/59, 244 A; 200/84 R, 200/61.2, 5 A

[56] References Cited
UNITED STATES PATENTS

| | | | |
|---|---|---|---|
| 705,421 | 7/1902 | Moore | 200/84 R |
| 1,324,522 | 12/1919 | Saltzman | 200/84 R |
| 1,719,078 | 7/1929 | Papashvili | 200/84 R |
| 3,211,853 | 10/1965 | Corvoisier | 200/84 R |

Primary Examiner—Glen R. Swann, III
Attorney, Agent, or Firm—William R. Piper

[57] ABSTRACT

An oil level indicating device for a crankcase or transmission can be readily connected to the oil pan or transmission and has a plurality of float-actuated switches placed at different levels, each switch closing an electric circuit to its associate level indicating signal, whereby the illuminated signal will indicate how much oil, if any, needs to be added to bring the oil up to the proper level or whether there is too much oil.

4 Claims, 5 Drawing Figures

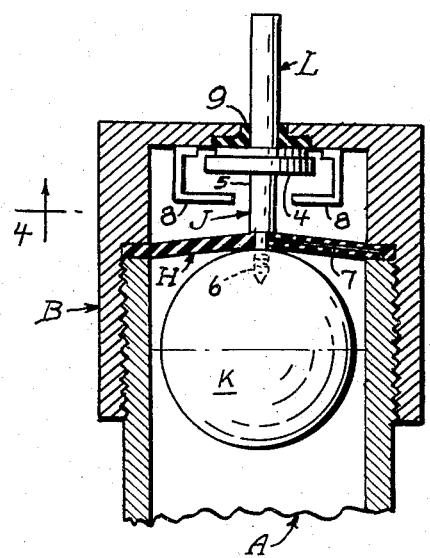
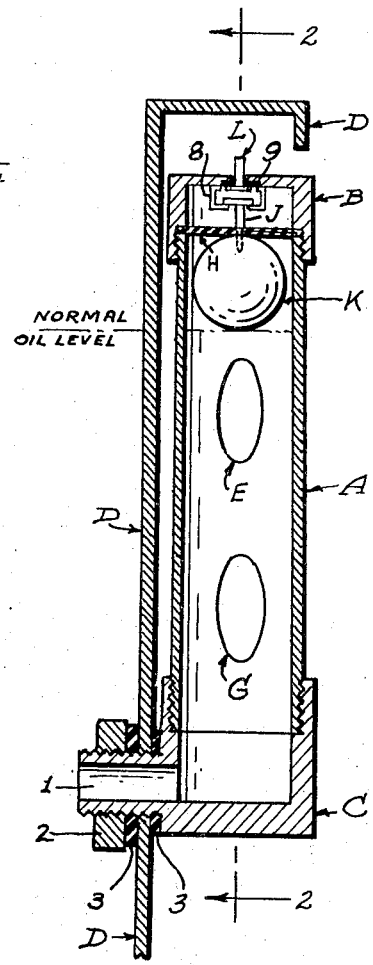
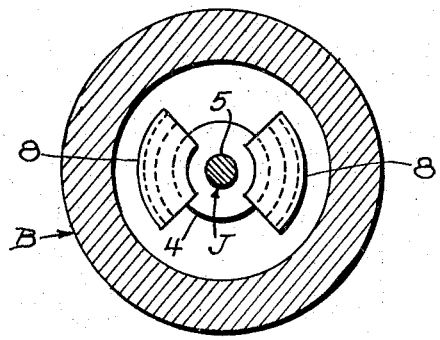

OIL LEVEL INDICATING DEVICE FOR A CRANKCASE OR TRANSMISSION

BACKGROUND OF THE INVENTION

It is vital for the driver of an automobile to know whether there is a sufficient amount of oil in the crankcase and/or transmission of the vehicle. This information should be constantly displayed on the instrument panel of the vehicle so as to keep the driver informed. It is possible for too much oil to be added to the crankcase or transmission. I have, therefore, designed my device to register when there is too much oil as well as register when the crankcase of transmission is full. In addition, when oil should be added, my device will indicate whether one or two quarts is the necessary amount.

The U.S. Pat. to James F. Chappell, No. 1,813,382, issued July 7, 1931, discloses an oil level indicating device that includes an oil container communicating with the transmission of an internal combustion engine and having two or more vertically extending arms arranged at equal angles from each other about a central axis. These arms receive oil from the container and if the vehicle is tilted at an angle from a horizontal plane due to the surface of the road, the oil level in the arms will be at different positions. Floats are mounted in the arms and will close electric circuits to indicate when the oil level is low and when a sufficient amount of oil has been added.

Nothing in this patent is used for indicating various oil levels in the crankcase or transmission or how much oil to add should the oil level be too low.

The patent to Luther H. Huckabee, U.S. Pat. No. 2,700,153, issued Jan. 18, 1955, is for a low water warning signal and cutoff system for a vehicle radiator. A pair of electrical contacts are placed at different levels in the radiator for first signalling a preliminary loss of coolant in the radiator and, if water is not added to the radiator and there is a further loss of coolant, then the other electrical contact will effect the cut-off of the electrical supply to the ignition coil of the engine causing the engine to stop.

Here again, nothing in this patent is used for indicating the various oil levels in a crankcase or transmission and how much oil should be added in case the oil level is too low.

SUMMARY OF THE INVENTION

An object of my invention is to provide a multilevel indicating device for a crankcase or transmission which will show on the instrument panel of the vehicle whether the oil level is too high or at the correct level. It will also show how much oil to add when the oil level gets too low. The device is compact in size and it can be quickly attached to the crankcase or transmission of a vehicle.

BRIEF DESCRIPTION OF THE DRAWINGS

FIG. 1 is a vertical section through the device and it is shhown attached to the side wall of a vehicle oil pan or transmission.

FIG. 3 is an enlarged sectional detail of the float-controlled switch used to indicate that the oil level is too full.

FIG. 4 is a horizontal section taken along the line 4—4 of FIG. 3.

DESCRIPTION OF THE PREFERRED EMBODIMENT

In carrying out my invention, the device comprises a tubular body A, a cap B and a hollow base member C, see FIG. 1, these three members forming a casing for receiving oil. The base member has an oil inlet pipe 1 that can be inserted into an opening in the oil pan D of an internal combustion engine, not shown, or in a transmission, not shown. A nut 2, threaded onto the threaded end of the pipe 1, and a pair of washers 3 make a liquid tight seal between the pipe 1 and oil pan D. The device is positioned on the oil pan so that some oil will flow from the oil pan into the casing and when the level of the oil in the oil pan is at the proper level, the device will close an electric circuit to illuminate the word, "FULL," on the instrument panel. The mechanism for accomplishing this will be hereinafter described.

Figure 2:
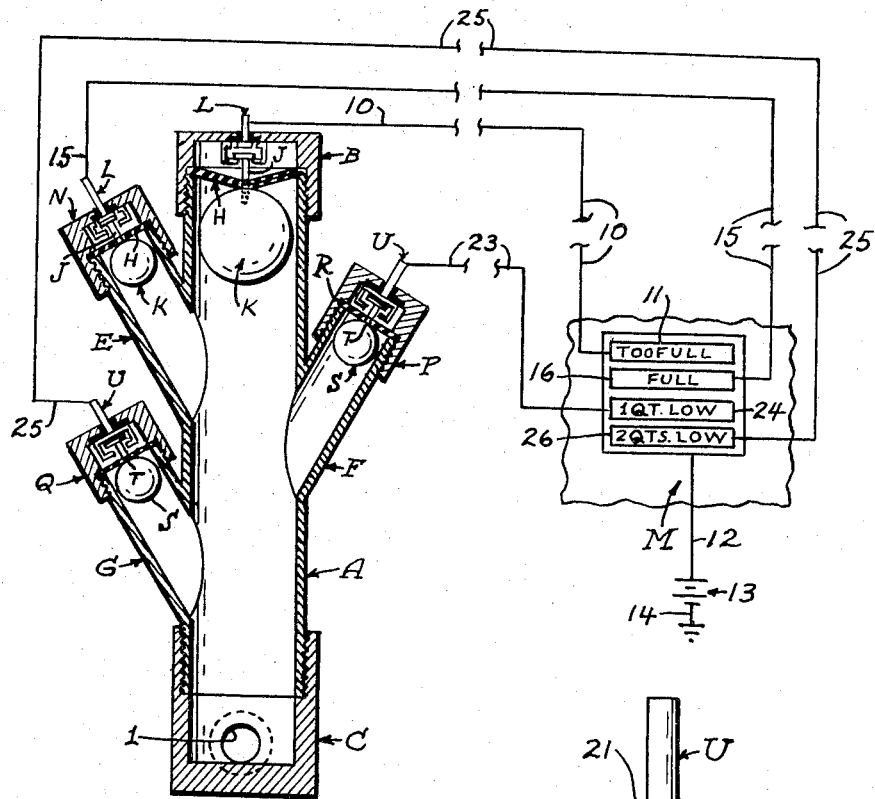
FIG. 2 is a vertical section taken along the line 2—2 of FIG. 1 and illustrates the electrical connection between the various float-controlled switches and the multiple signals mounted on the instrument panel of the vehicle.

Referring to FIG. 2, it will be noted that the tubular body A has three tubular stub branches E, F, and G, that extend upwardly and at an inclined angle to the tubular body A. These stub branches communicate with the main tubular body A at three different elevations and a float controlled switch is mounted in each branch for closing an electric circuit for illuminating different words on the instrument panel for indicating when the oil pan is "FULL" or when the oil level is "1 QT. LOW" or "2 QTS. LOW". The same type of float controlled switch is used in the two tubular stub branches F and G, but before describing these switches in detail, it is best first to describe a float controlled switch in the top of the main tubular body A and in the cap. The switch in the body A will illuminate a "TOO FULL" sign on the instrument panel when the oil level in the oil pan D and in the tubular body A reaches a point where the float controlled switch in the body A will close and illuminate the words "TOO FULL." The switch in the branch E will remain closed and continue to illuminate the sign "FULL" after the oil level drops to a point to open the switch in the body A. In FIGS. 1, 2 and 3, I show a diaphragm H extending across the top of the tubular body A and made from a non-conduction material. The cap B clamps the diaphragm in place. A movable contact J has a disc-shaped head 4, a stem 5 and a threaded reduced end 6 that extends through the center of the diaphragm H and into a ball-shaped float K, see the enlarged sectional view in FIG. 3. An electric wire 7 is embedded in the non-conducting diaphragm H, and it is connected to the movable contact J, and to the metal tubular body A that consitutes an electric ground for the circuit, hereinafter described.

Non-conducting arms 8, see FIGS. 3 and 4, have inwardly extending lower ends that form a cage-like structure in the cap B for receiving the disc-shaped head 4 of the movable contact J. When the oil level in the oil pan is at normal, the oil level in the tubular body A will be too low to lift the float K and the disc 4 of the movable contact J will rest on the inwardly extending ends of the non-conducting arms 8 and no electric circuit will be closed. The diaphragm H will be in its depressed position, as shown in FIGS. 1 and 2.

However, should too much oil be in the oil pan D, the oil level in the tubular body A will raise the ball float K and lift the movable contact J until the disc-shaped head 4 of the contact will strike a stationary contact L. The stationary contact L is carried by the cap B and is insulated from the cap by insulating material 9, see FIG. 3. In FIG. 2, I show a wire 10 leading from the stationary contact L to a sign 11 on the instrument panel M of the vehicle reading "TOO FULL." A wire 12 leads from the sign 11 to a source of current 13 and another wire 14 leads from the source of current 13 to ground so as to complete the circuit and illuminate the sign "TOO FULL." Therefore, if too much oil is added to the oil pan D so as to raise the ball float K and cause the movable contact J to strike the stationary contact L, the sign 11 will be illuminated and inform the operator of this fact.

My device not only will show when too much oil has been added to the oil pan D, or to the transmission, but the three tubular stub branches E, F and G are provided with float controlled switches which, respectively, illuminate signs on the instrument panel of the vehicle reading, "FULL," "1 QT. LOW," and "2 QTS. LOW." The float controlled switch in the stub branch E is of the same structure as the float controlled switch shown in FIG. 3, which has already been described. Therefore like reference numerals will be given to corresponding parts.

When the oil level in the oil pan is at normal, the oil level in the stub branch E, in FIG. 2, will cause the ball float K in that Figure to raise the movable contact J to strike the stationary contact L in the cap N for the stub branch E and close an electric circuit through the wire 15 to the sign 16 on the instrument panel M, reading "FULL." The circuit is completed through the battery 13 and back to ground.

The float controlled switches in the stub branches F and G are identical to each other and, therefore, I will describe in detail the float controlled switch in the stub branch F and it will also suffice for the float controlled switch in the stub branch G.

Figure 5:
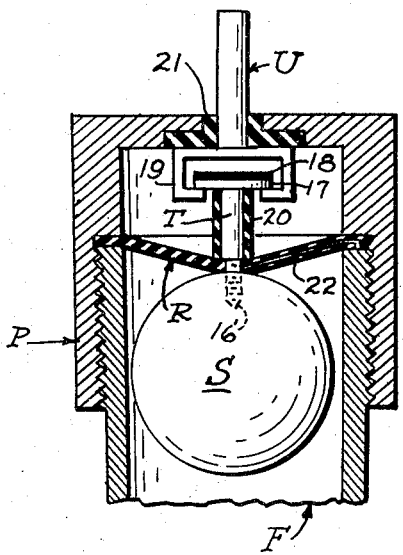
FIG. 5 is an enlarged sectional detail of one of the float-controlled switches used in the oil branch pipes.

In FIGS. 2 and 5, I illustrate the stub branch F and its float controlled switch. The branch F is closed by a cap P, while the branch G is closed by a cap Q. The cap P encloses a diaphragm R of non-conducting material and clamps it to the top of the stub branch F. A ball-shaped float S of non-conducting material is secured to the underside of the diaphragm R by a movable contact T that extends above the diaphragm and has a reduced and threaded lower end 16' that projects through the center of the diaphragm and on into the ball float S. In this way the movable contact T, the diaphragm R and the float S are all interconnected.

The movable contact T, see FIG. 5, has a disc-shaped head 17 and a layer of insulation 18 covers the top of the head. A stationary contact U is carried by the cap P and it has channel-shaped arms 19 that form a cage for receiving the disc-shaped head 17 of the movable contact T. The stem portion of the movable contact T is enclosed in a sleeve 20 of insulating material and the portion of the stationary contact U that extends through the cap P is also protected by an insulating sleeve 21. A wire 22 is embedded in the diaphragm R and it makes an electrical connection between the movable contact T and the stub branch F.

FIG. 2 shows a wire 23 leading from the stationary contact U in the cap to a sign 23 that reads, "1 QT. LOW." When the oil level in the oil pan D drops to a level where the corresponding level in the stub branch F drops to a point where the ball float S in FIG. 5 will permit the diaphragm R to be depressed and the movable contact T lowered to where its disc head 17 will contact the inwardly turned ends of the arms 19, then an electric circuit will be closed through the wire 22, the movable contact T, the wire 23 from the stationary contact U and will cause the sign 24 on the instrument panel M to become illuminated and to flash the warning words, "1 QT. LOW." The driver of the vehicle should then add one quart of oil to the oil pan and this will raise the oil level both in the oil pan and in the stub branch F a sufficient distance to raise the ball float S and movable contact T to break its electrical connection with the channel-shaped arms 19 of the stationary contact U. The sign 24 will then cease to illuminate the warning words, "1 QT. LOW."

I provide a second warning signal when there is a need to add 2 quarts of oil to the oil pan D. In FIG. 2, I show the stub branch G placed at a lower level than the stub branch F. The branch G is closed by the cap Q and the float controlled switch in this branch G and cap Q is identical to that in the stub branch F and cap P. Therefore, like reference numerals for corresponding parts in the two float controlled switches will be given and a detailed description of the float controlled switch in the stub branch G and the cap Q need not be given.

When the oil level in the oil pan D drops to a point where the corresponding oil level in the stub branch G permits the ball float S in this branch to lower and cause its movable contact T to make an electrical connection with its associate stationary contact U, then an electric circuit will flow from the stationary contact U, in the cap Q, through a wire 25 to a sign 26 on the instrument panel M, to illuminate the warning words, "2 QTS. LOW." The driver should add 2 quarts of oil to the oil pan D to bring the oil level up to normal.

I have described how my device can give four different kinds of information to the driver as to the level of oil in the pan D or in a transmission. The device can be readily attached to the oil pan or transmission casing and the four signs 11, 16, 24 and 26 can be mounted on the instrument panel M of the vehicle. As already stated, the sign 11 displays the words "TOO FULL," when it is illuminated and this means that the oil level in the oil pan is above normal level. When the oil level is at normal, then the sign 16 will be illuminated to display the word "FULL." The next two signs 24 and 26 when illuminated will indicate how much oil to add to the oil pan. The sign 24 indicates that one quart of oil is to be added and the sign 26 indicates that two quarts of oil are to be added.

I claim:

1. In combination:
    a. a casing connectible to the oil pan of an internal combustion engine to receive oil therefrom, the casing being positioned on the oil pan so that the oil level in the oil pan will be the same as the oil level in the casing;
    b. a first branch communicating with the casing at a lower elevation than the top of the casing;

c. a first float-controlled switch mounted in the upper end of said casing and a second float controlled switch mounted in the upper end of said first branch, said first switch closing an electric circuit to illuminate a first sign on the instrument panel, reading TOO FULL, when the oil level in said casing raises the float therein to actuate the switch, the communication of said first branch with the casing being at an angle to prevent said second float interfering with said first float in said casing;

d. said second switch closing an electric circuit to illuminate a second sign on the instrument panel, reading FULL, when the oil level in said casing and branch drops to a point where said first float-controlled switch opens but said second float-controlled switch remains closed.

2. The combination as set forth in claim 1: and in which a. both of said switches are protected from oil by diaphragms extending across the casing and first branch, respectively.

3. The combination as set forth in claim 1: and further comprising a. a second branch communicating with said casing at a lower level than said first branch;

b. a third branch communicating with the casing at a lower level than that of the second branch;

c. a third float-controlled switch mounted in said second branch and closing an electric circuit to illuminate a third sign on the instrument panel reading, 1 QT. LOW, when the oil level in said second branch drops below a predetermined point in said second branch; and d. a fourth float-controlled switch mounted in said third branch and closing an electric circuit to illuminate a fourth sign on the instrument panel reading, 2 QTS. LOW, when the oil level in said third branch drops below a predetermined point in said third branch, the communication of said second and third branches with said casing being angled to prevent said second and third floats from interfering with each other and with the floats in said first branch and casing.

4. The combination as set forth in claim 3: and wherein a. both the third and fourth switches are protected from oil by diaphragms extending across said second and third branches, respectively, and positioned between the float and the associate switch.

* * * * *